United States Patent
Yamanouchi

(10) Patent No.: US 7,092,179 B2
(45) Date of Patent: Aug. 15, 2006

(54) WRITE PRECOMPENSATION AMOUNT SETTING METHOD AND APPARATUS

(75) Inventor: Hidetake Yamanouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 10/729,283

(22) Filed: Dec. 5, 2003

(65) Prior Publication Data

US 2004/0113611 A1  Jun. 17, 2004

Related U.S. Application Data

(63) Continuation of application No. PCT/JP01/05906, filed on Jul. 6, 2001.

(51) Int. Cl.
  *G11B 5/09* (2006.01)
  *G01R 33/12* (2006.01)

(52) U.S. Cl. .................. 360/45; 360/69; 324/210; 324/224

(58) Field of Classification Search .................. None
See application file for complete search history.

(56) References Cited

U.S. PATENT DOCUMENTS

| 6,043,944 A | * | 3/2000 | Yamasaki et al. | 360/51 |
| 6,954,320 B1 | * | 10/2005 | Yang | 360/46 |
| 2002/0105748 A1 | * | 8/2002 | Lamberts | 360/69 |

FOREIGN PATENT DOCUMENTS

| JP | 10-340413 | | 12/1998 |
| JP | 2002170202 A | * | 6/2002 |
| WO | WO 03/005348 A1 | * | 1/2003 |

* cited by examiner

*Primary Examiner*—Wayne Young
*Assistant Examiner*—Dan I Davidson
(74) *Attorney, Agent, or Firm*—Greer, Burns & Crain, Ltd.

(57) ABSTRACT

A write precompensation amount setting method and apparatus comprise a function detecting the respective head characteristics with an electric current used at an ordinary temperature and a irregular electric current, and a function setting an optimum write precompensation amount at a low temperature according to the detected head characteristics.

As a result, a write precompensation amount is corrected according to the characteristics of the normal current and the irregular current, and a write precompensation amount is determined, so that the write precompensation amount with higher accuracy than that with a conventional technique can be determined.

8 Claims, 4 Drawing Sheets

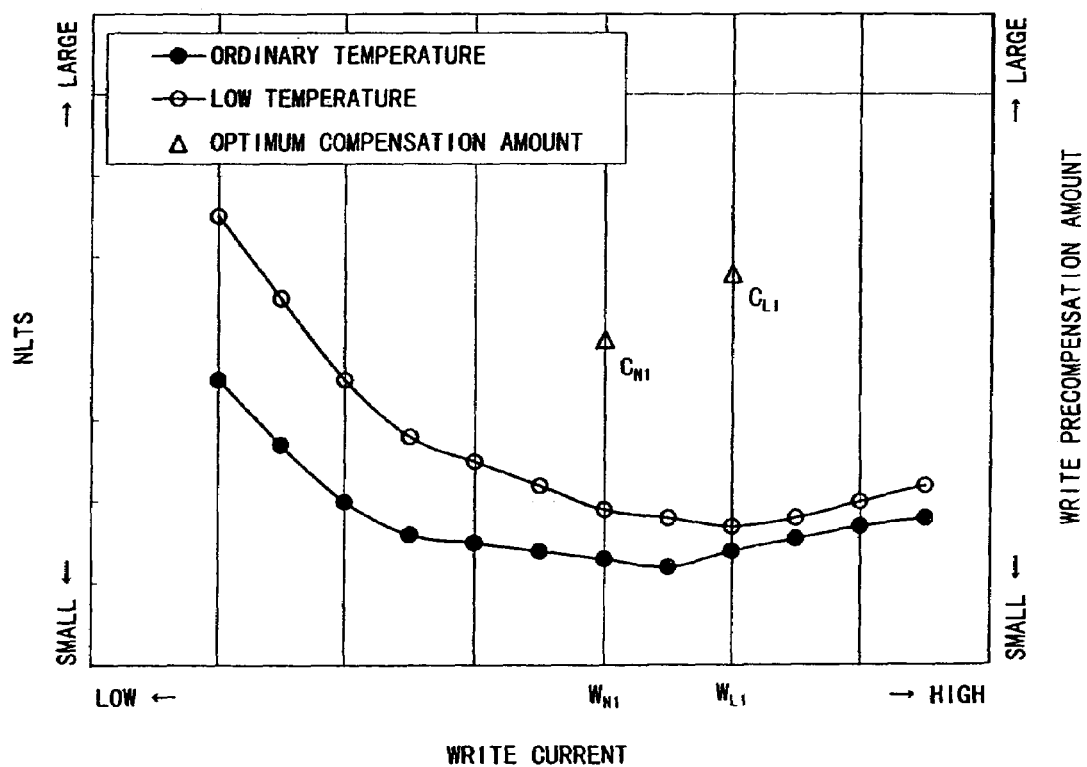
F I G. 2

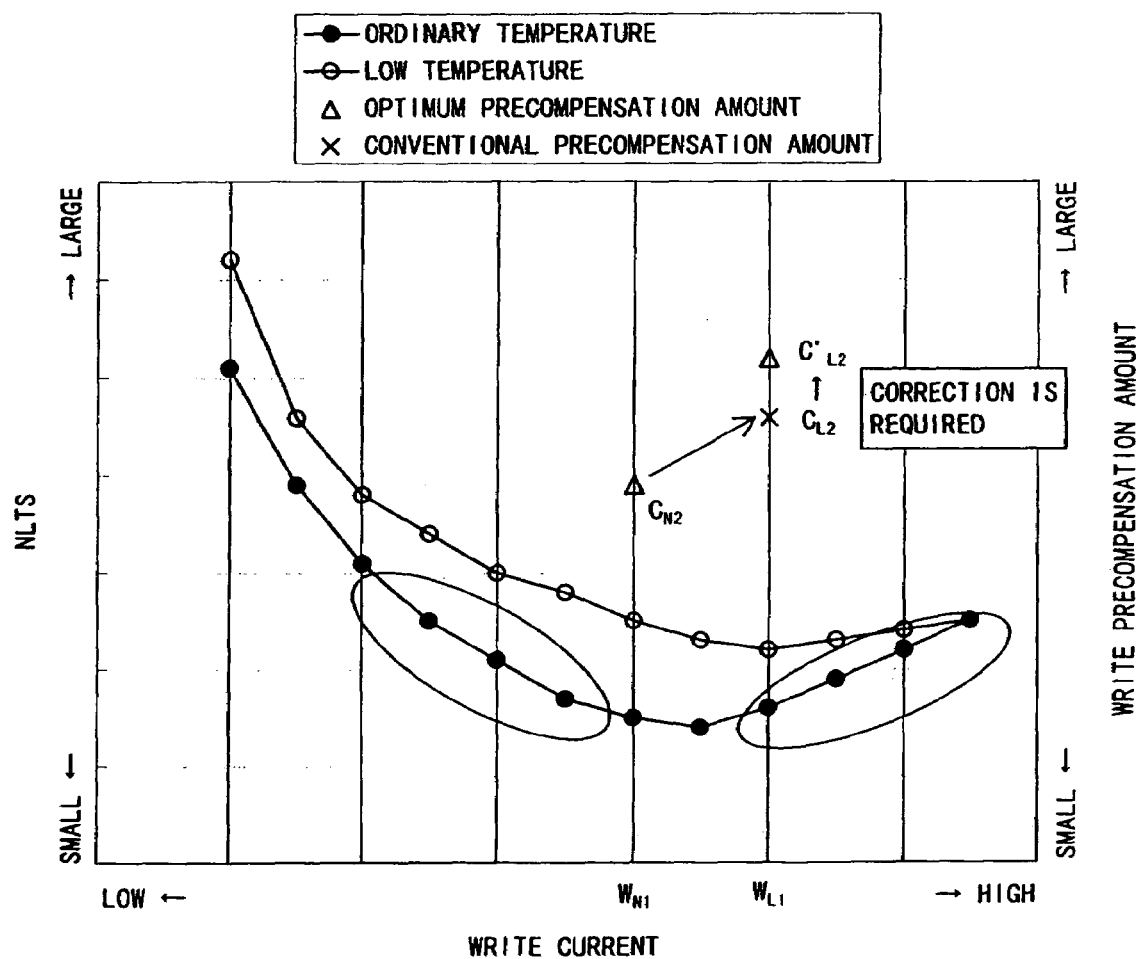
F I G. 3

WRITE PRECOMPENSATION AMOUNT SETTING METHOD AND APPARATUS

CROSS REFERENCE TO RELATED APPLICATION

This application is a continuation of international PCT application No. PCT/JP01/05906 filed on Jul. 6, 2001.

BACKGROUND OF THE INVENTION

1. Field of the Invention

The present invention relates to a write precompensation amount setting method and apparatus, which tune a write precompensation amount of a magnetic disk device, and more particularly, to a write precompensation amount setting method and apparatus for reducing a compensation shift which becomes problematic in a magnetic disk device.

2. Description of the Related Art

When magnetically recorded digital data is reproduced with a magnetic head, a peak shift occurs on a reproduced waveform. This peak shift is caused by a mutual interference with an adjacent bit (magnetized region) when a magnetized region corresponding to a bit array is read with a magnetic head. If the peak shift increases, a read pulse cannot be obtained at a position determined by a data window, which leads to a read error. The peak shift of this type is not too problematic when a recording density is low, but is problematic when the recording density is high. A method of compensating for a peak shift is a tuning method where the phase of a pre-identified bit, when data of a particular bit array whose peak shift is problematic, is recorded. In other words, a method compensating for a write operation (write precompensation).

Conventionally, a write precompensation amount according to an environmental temperature is determined at an ordinary temperature for each head as a drive parameter, and uniformly set for each environmental temperature in normal cases.

FIG. 1 is a flowchart showing the conventional process for setting a write precompensation amount.

Firstly, error rates are measured at ordinary and low temperatures in a test drive (step S1). For example, respective error rates are measured when a write precompensation amount at an ordinary temperature (such as 25 degrees centigrade) with a write current 40 mA, and a write precompensation amount at a low temperature (such as 5 degrees centigrade) with a write current 50 mA are changed between 15 and 30% in steps of 1%.

Next, the write precompensation amounts at the best (minimum) error rates among the error rates measured in step S1 are determined as optimum write precompensation amounts at the ordinary and the low temperatures in the test drive (step S2). For example, if the write precompensation amounts at the lowest error rates at the ordinary temperature of 25 degrees centigrade and the low temperature of 5 degrees centigrade are respectively 20 and 24%, a deterioration amount from 25 to 5 degrees centigrade is determined to be 4%.

Then, an error rate at an ordinary temperature is measured at the time of mass production (step S3). By way of example, each error rate is measured when the write precompensation amount at the ordinary temperature of 25 degrees centigrade with the write current 40 mA is changed between 15 and 30% in steps of 1%.

Furthermore, the write precompensation amount at the lowest error rate among the error rates measured in step S3 is determined to be an optimum write precompensation amount at the ordinary temperature at the time of mass production (step S4). For example, the write precompensation amount at the lowest error rate at the ordinary temperature of 25 degrees centigrade is determined to be 20%.

Lastly, an optimum write precompensation amount at a low temperature is set according to the deterioration amount determined in steps S1 and S2 at the time of mass production (step S5). By way of example, the deterioration amount of 4% from 25 to 5 degrees centigrade, which is determined in step S2, is added to the write precompensation amount of 20% at the lowest error rate at the ordinary temperature of 25 degrees centigrade, so that the write precompensation amount at the low temperature is set as 24%.

However, the environmental temperature characteristic of each magnetic head may vary. Actually, a magnetic head whose write characteristic deteriorates significantly at a low temperature requires a large write precompensation amount. Therefore, a lack of compensation occurs. At the same time, for a magnetic head whose write characteristic is good at a low temperature, over-compensation occurs. Namely, any heads whose characteristics shift from an average head characteristic can possibly cause error rate deterioration. This loss cannot be ignored toward future improvements in the performance of a magnetic disk device, and more accurate tuning has been demanded.

SUMMARY OF THE INVENTION

The present invention aims at providing a write precompensation amount setting method and apparatus that can optimize the write precomenstation amount of a magnetic disk device at the time of mass production, and can reduce a compensation shift which becomes problematic in a magnetic disk device, in view of the above described problems.

The write precompensation amount setting method and apparatus according to the present invention comprise a function detecting respective head characteristics with electric currents used at ordinary and irregular temperatures, and a function setting an optimum write precompensation amount at a low temperature according to the detected head characteristics.

According to the present invention, a write precompensation amount with accuracy higher than that of a conventional technique can be determined by correcting a write precompensation amount according to the characteristics of normal and irregular currents, and by determining the write precompensation amount.

In this case, one example of an irregular current is a current higher than that used at an ordinary temperature.

Another example of an irregular current is a current lower than that used at the ordinary temperature.

Additionally, the precompensation amount of each head with a current lower than that used at the ordinary temperature is obtained, and a write precompensation amount at a low temperature can be also obtained according to the above described precompensation amount.

Furthermore, the precompensation amount of each head with a current higher than that used at the ordinary temperature is obtained, and a write precompensation amount at a low temperature can be also obtained according to the above described precompensation amount.

Still further, an example of the head characteristic is a NLTS (Non-Linear Transition Shift) characteristic.

BRIEF DESCRIPTION OF THE DRAWINGS

FIG. 2 shows the dependency of the NLTS characteristic of a normal head on a write current;

FIG. 3 shows the dependency of the NLTS characteristic of a head whose low temperature characteristic is poor on a write current.

DESCRIPTION OF THE PREFERRED EMBODIMENTS

Hereinafter, a preferred embodiment according to the present invention is described with reference to FIGS. 2 to 4.

The characteristic of a magnetic head at an environmental temperature has a very close relationship with a change in the characteristic of the magnetic head, which depends on a write current.

FIG. 2 shows the dependency of the NLTS characteristic of a normal head on a write current.

A write precompensation amount at a low temperature with a write current $W_{L1}$ mA is determined to be $C_{L1}$% (to which a uniform addition amount of $C_{L1}-C_{N1}$% is applied) in contrast with a write precompensation amount $C_{N1}$% at an ordinary temperature (such as 25 degrees centigrade) with a write current $W_{N1}$ mA. A write precompensation amount always becomes large at a low temperature due to characteristic deterioration.

Since this is the write precompensation amount that is determined according to a margin test in a test drive using an average head, it is optimum for the average head.

FIG. 3 shows the dependency of the NLTS characteristic of a head whose low temperature characteristic is poor on a write current.

In contrast to 2, FIG. 3 shows the write current characteristic of the head whose low temperature characteristic significantly deteriorates. In this figure, a write precompensation amount at a low temperature with a write current $W_{L1}$ mA is determined to be $C_{L2}=C_{N2}+(C_{L1}-C_{N1})$%, to which the uniform addition amount is applied, in comparison with a write precompensation amount $C_{N2}$% at an ordinary temperature with a write current $W_{N1}$ mA. However, this is not an optimum write precompensation amount. The optimum precompensation amount is $C_{L2}'$%.

For such a head, the characteristic of a low (or high) current significantly deteriorates in comparison with the characteristic of a normal current at an ordinary temperature. In this case, for example, the NLTS value of a write current $WL_{N2}$ (<$W_{N1}$) mA (at an ordinary temperature) is poorer than that of a normal current by N %.

Accordingly, for example, Ke×N %, which is obtained by multiplying N by a coefficient, is added, so that the write precompensation amount results in $C_{L2}$+Ke×N %. Consequently, the accuracy of the compensation can be improved.

Figure 1:
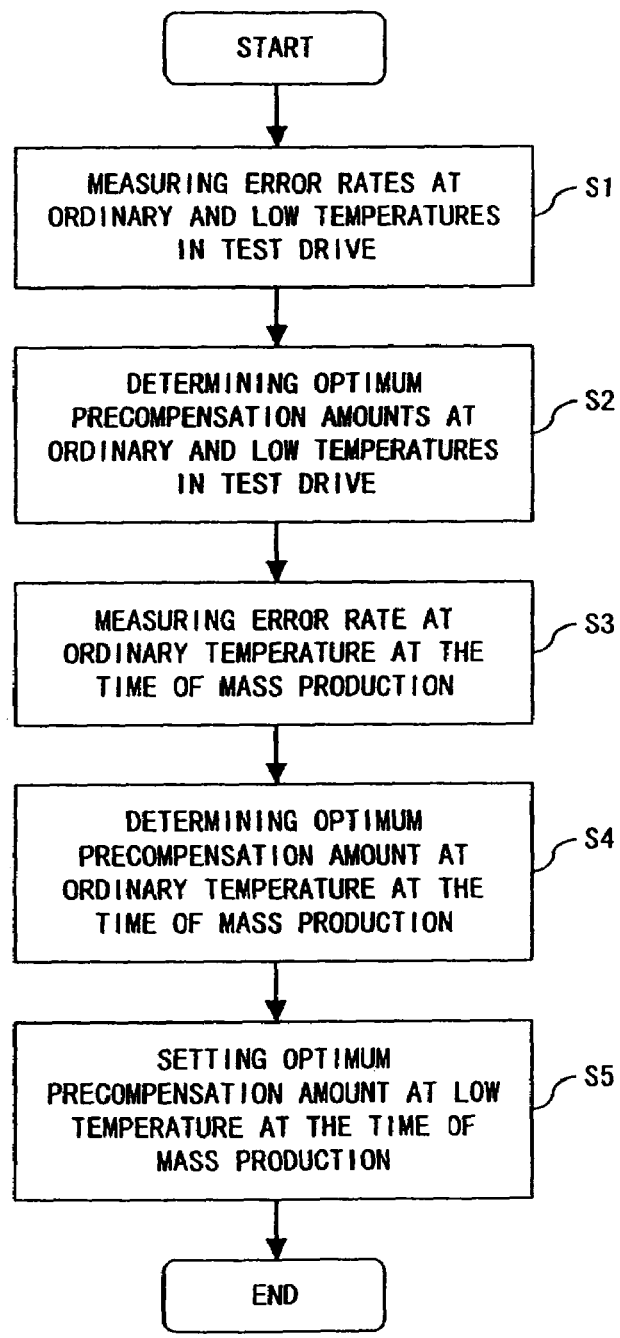
FIG. 1 is a flowchart showing the conventional process for setting a write precompensation amount.
Figure 4:
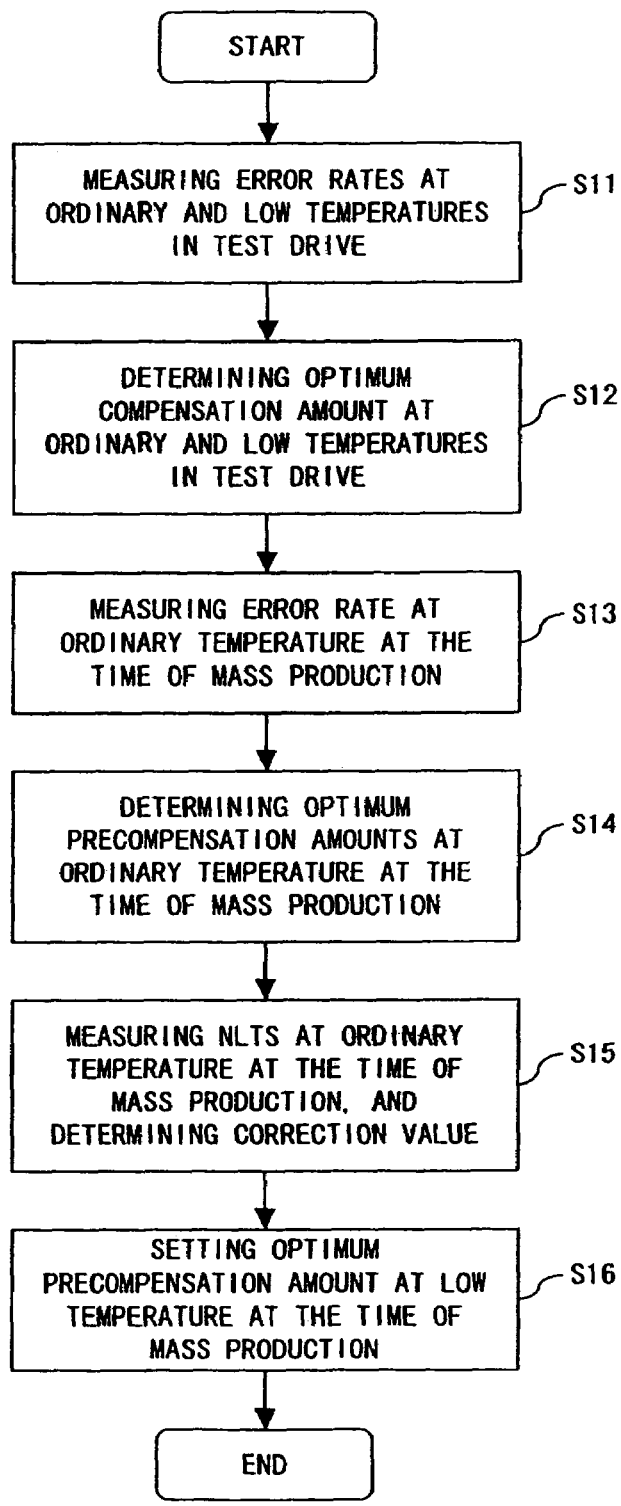
FIG. 4 is a flowchart showing the process for setting a write precompensation amount, according to the present invention.

FIG. 4 is a flowchart showing the process for setting a write precompensation amount, according to the present invention.

Firstly, error rates at ordinary and low temperatures are measured in a test drive (step S11). By way of example, respective error rates are measured when a write precompensation amount at an ordinary temperature (such as 25 degrees centigrade) with a write current 40 mA, and a write precompensation amount at a low temperature (such as 5 degrees centigrade) with a write current 50 mA are changed between 15 and 30% in steps of 1%.

Next, the write precompensation amounts at the best (minimum) error rates among the error rates measured in step S11 are determined to be the optimum write precompensation amounts at the ordinary and the low temperatures in the above described test drive (step S12). For instance, if the write precompensation amount at the lowest error rate at the ordinary temperature of 25 degrees centigrade, and the write precompensation amount at the lowest error rate at the low temperature of 5 degrees centigrade are respectively 20 and 24%, a deterioration amount from 25 to 5 degrees centigrade is determined to be 4%.

Then, at the time of mass production, an error rate at an ordinary temperature is measured (step S13). For example, each error rate is measured when a write precompensation amount at the ordinary temperature of 25 degrees centigrade with the write current 40 mA is changed between 15 and 30% in steps of 1%.

Additionally, at the time of mass production, the write precompensation amount at the lowest error rate among the error rates measured in step S13 is determined to be the optimum write precompensation amount at the ordinary temperature (step S14). For example, the write precompensation amount at the lowest error rate at the ordinary temperature 25 degrees centigrade is determined to be 22%.

Furthermore, at the time of mass production, the NLTS at the ordinary temperature is measured, and a correction value is determined (step S15). For example, the NLTS at the ordinary temperature of 25 degrees centigrade with the write current 40 mA (normally used current), and the NLTS at the ordinary temperature of 25 degrees centigrade with the write current 25 mA (current lower than the normally used current) are measured. Assuming that the measured results are respectively 14 and 25%, the correction value is obtained by calculating $(25-14) \div 2.49 \approx 4.4$ with the use of these values and a coefficient Ke(=2.49).

Lastly, at the time of mass production, an optimum write precompensation amount at a low temperature is determined according to the deterioration amount determined in step S12, and the correction value obtained in step S15 (step S16). For example, the deterioration amount of 4% from 25 to 5 degrees centigrade, which is determined in step S12, and the correction value of 4.4% obtained in step S15 are added to the write precompensation amount of 22% at the lowest error rate at an ordinary temperature of 25 degrees centigrade, so that the optimum write precompensation amount at the low temperature is set as 30.4%.

The above preferred embodiment is described by using the NLTS characteristic as a head characteristic. However, the head characteristic may be a different characteristic such as a XTALK (crosstalk) characteristic, etc.

Additionally, a current higher than a normally used current may be used instead of a current lower than the normally used current.

As described above, the present invention can take a variety of configurations within the scope where the gist of the present invention is not deviated, without being limited to the above described preferred embodiment.

With the write precompensation amount setting method and apparatus according to the present invention, a write precompensation amount is corrected according to the characteristics of a normal current and a low or high current, and a write precompensation amount is determined, so that the write precompensation amount with accuracy higher than that with a conventional technique can be determined.

What is claimed is:

1. A write precompensation amount setting method, comprising
setting an optimum write precompensation amount at a low temperature according to respective head characteristics with an electric current used at an ordinary temperature, and at an irregular electric current,
wherein the irregular electric current is an electric current lower than the electric current used at the ordinary temperature.

2. The write precompensation amount setting method according to claim 1, wherein
the head characteristics are a non-linear transition shift (NLTS) characteristic.

3. A write precompensation amount setting method, comprising
setting an optimum write precompensation amount at a low temperature according to respective head characteristics with an electric current used at an ordinary temperature, and at an irregular electric current,
obtaining a precompensation amount of each head with an electric current lower than the electric current used at the ordinary temperature, and
determining a write precompensation amount at the low temperature according to the obtained precompensation amount.

4. The write precompensation amount setting method according to claim 3, wherein
the head characteristics are a non-linear transition shift (NLTS) characteristic.

5. A write precompensation amount setting apparatus, comprising:
a detecting unit detecting respective head characteristics with an electric current used at an ordinary temperature, and an irregular electric current; and
a setting unit setting an optimum write precompensation amount at a low temperature according to the head characteristics detected by said detecting unit,
wherein the irregular electric current is an electric current lower than the electric current used at the ordinary temperature.

6. The write precompensation amount setting apparatus according to claim 5, wherein
the head characteristics are a non-linear transition shift (NLTS) characteristic.

7. A write precompensation amount setting apparatus, comprising:
a detecting unit detecting respective head characteristics with an electric current used at an ordinary temperature, and an irregular electric current; and
a setting unit setting an optimum write precompensation amount at a low temperature according to the head characteristics detected by said detecting unit,
wherein a precompensation amount of each head with an electric current lower than the electric current used at the ordinary temperature is obtained, and a write precompensation amount at the low temperature is determined according to the obtained precompensation amount.

8. The write precompensation amount setting apparatus according to claim 7, wherein
the head characteristics are a non-linear transition shift (NLTS) characteristic.

* * * * *